United States Patent
Menjak et al.

(10) Patent No.: US 6,598,695 B1
(45) Date of Patent: Jul. 29, 2003

(54) DRIVE-BY WIRE STEERING SYSTEMS HAVING A STOP MECHANISM

(75) Inventors: Ratko Menjak, Frankenmuth, MI (US); Zdravko Menjak, Frankenmuth, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/060,575

(22) Filed: Jan. 30, 2002

(51) Int. Cl.[7] .............................................. B62D 5/04
(52) U.S. Cl. ...................................... 180/402; 180/444
(58) Field of Search ................................ 180/402, 403, 180/443, 444, 446

(56) References Cited

U.S. PATENT DOCUMENTS

| | | | |
|---|---|---|---|
| 4,153,133 A | 5/1979 | Anderson | 180/154 |
| 5,251,135 A | 10/1993 | Serizawa et al. | 364/424.05 |
| 5,615,582 A * | 4/1997 | Rupp | 74/498 |
| 5,908,457 A | 6/1999 | Higashira et al. | 701/41 |
| 6,012,540 A | 1/2000 | Bohner et al. | 180/402 |
| 6,035,251 A | 3/2000 | Hac et al. | 701/70 |
| 6,041,882 A | 3/2000 | Bohner et al. | 180/402 |
| 6,059,068 A | 5/2000 | Kato et al. | 180/402 |
| 6,069,505 A | 5/2000 | Babanezhad | 327/156 |
| 6,072,293 A | 6/2000 | Shimizu et al. | 318/432 |
| 6,176,341 B1 | 1/2001 | Ansari | 180/402 |
| 6,283,243 B1 | 9/2001 | Bohner et al. | 180/406 |
| 6,481,526 B1 * | 11/2002 | Millsap et al. | 180/402 |
| 2002/0189888 A1 * | 12/2002 | Magnus et al. | 180/402 |

FOREIGN PATENT DOCUMENTS

DE 19904308 A1 * 4/2000 ............ B62D/5/04

* cited by examiner

*Primary Examiner*—Kevin Hurley
(74) *Attorney, Agent, or Firm*—Edmund P. Anderson

(57) ABSTRACT

A drive-by wire steering system is provided. The steering system comprises a steering shaft and a stop mechanism. The steering shaft is configured for a first angular displacement about a first axis. The steering shaft comprises a first geared portion and a first end. The first end is connectable to a vehicle's steering wheel. The stop mechanism comprises a stop portion and a second geared portion. The stop portion defines a first position and a second position. The first geared portion and the second geared portion are operatively engaged such that angular displacement of the steering shaft imparts a second angular displacement about a second axis to the stop mechanism. The first angular displacement is limited when the second angular displacement is such that the steering shaft abuts the stop portion at either the first position or the second position.

13 Claims, 3 Drawing Sheets

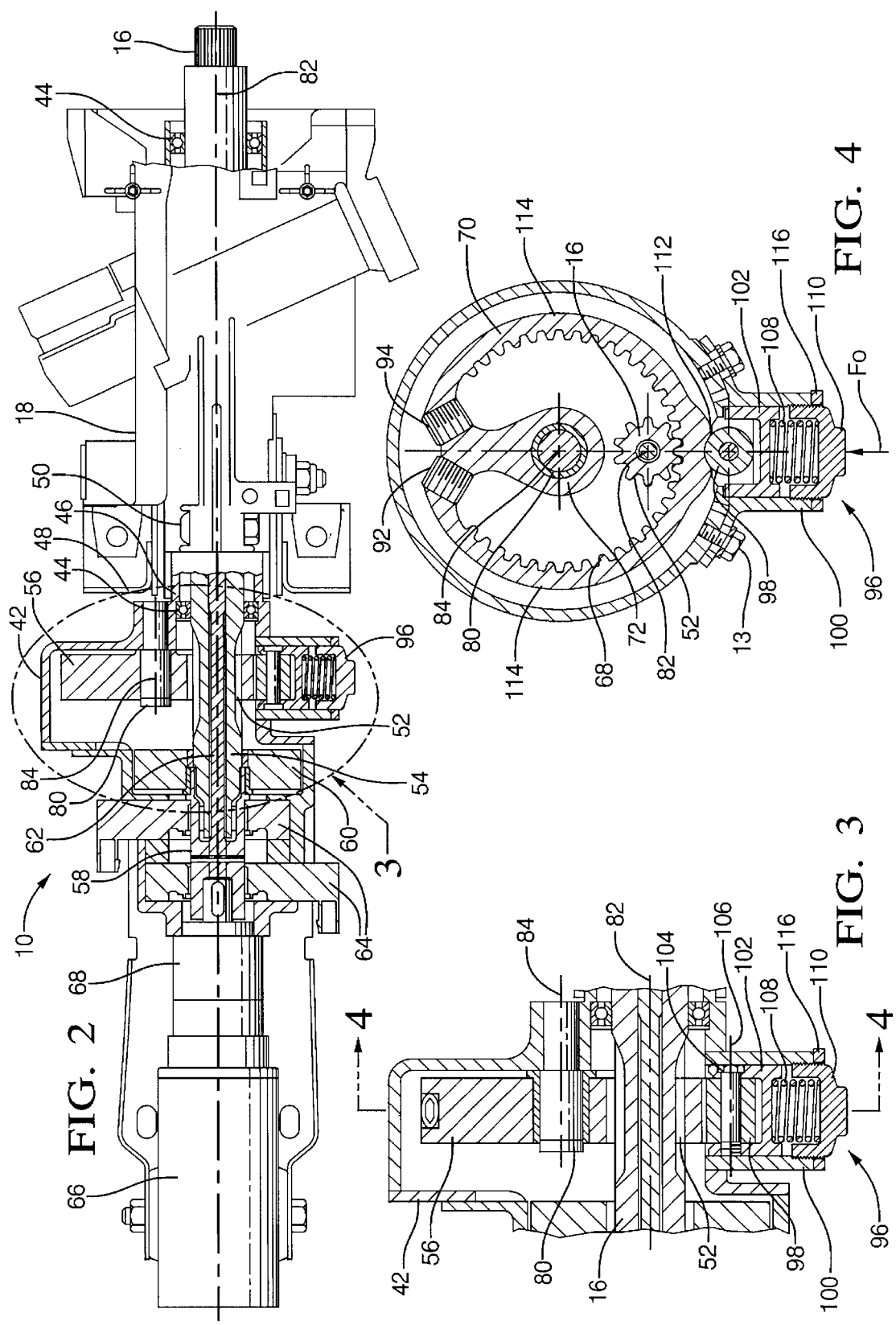

DRIVE-BY WIRE STEERING SYSTEMS HAVING A STOP MECHANISM

TECHNICAL FIELD

This disclosure relates generally to drive-by-wire steering systems. More specifically, this disclosure relates to drive-by-wire steering systems having a stop mechanism.

BACKGROUND

Vehicles require a steering system to control the direction of travel. Previously, mechanical steering systems have been used. Mechanical steering systems typically include a mechanical linkage or a mechanical connection between the steering wheel and the vehicle's road wheels. Thus, movement of the steering wheel causes a corresponding movement of the road wheels. Movement of such mechanical systems is often power assisted through the use of hydraulic assists or electric motors.

Mechanical steering systems are being replaced and/or supplemented by electrically driven steering systems, commonly known as "steer-by-wire" systems. Such steer-by-wire systems to varying extents replace, for example, the mechanical linkage between the steering wheel and the vehicle wheels with an electrically assisted actuator.

This migration to steer-by-wire systems is being made to improve fuel economy, increase vehicle modularity, reduce load on the engine of the vehicle, reduce vehicle weight, and provide four-wheel-steering. For example, the use of steer-by-wire systems eliminates the need for hydraulic fluids, provides a tighter turning radius, and reduces the weight of the vehicle.

Additionally, steer-by-wire systems eliminate various undesirable problems present in mechanical systems. For example in steer-by-wire systems, the steering wheel is mechanically isolated from the road wheels. Thus, excessive deleterious feed back to the steering wheel in the form of shudders, and steering wheel kickback from the road wheels is eliminated.

Unfortunately, mechanically isolating the steering wheel from the road wheel also eliminates desired feed back. For example, during the use of mechanical steering systems, the rotation of the steering wheel is mechanically limited by the travel of the road wheels of the vehicle. Unfortunately, the mechanical isolation provided by drive-by-wire steering systems eliminates this desired feedback.

SUMMARY

A drive-by wire steering system is provided. The steering system comprises a steering shaft and a stop mechanism. The steering shaft is configured for a first angular displacement about a first axis. The steering shaft comprises a first geared portion and a first end. The first end is connectable to a vehicle's steering wheel. The stop mechanism comprises a stop portion and a second geared portion. The stop portion defines a first position and a second position. The first geared portion and the second geared portion are operatively engaged such that angular displacement of the steering shaft imparts a second angular displacement about a second axis to the stop mechanism. The first angular displacement is limited when the second angular displacement is such that the steering shaft abuts the stop portion at either the first position or the second position.

A method is provided for protecting a sensor in a drive-by wire steering system where the sensor has a predetermined displacement range. The method includes connecting the sensor to a steering shaft, engaging a stop mechanism to the steering shaft, and abutting the stop mechanism and the steering shaft at a first position and a second position to limit the angular displacement of the steering shaft such that the sensor is maintained within the predetermined displacement range. The steering shaft is configured for a first angular displacement about a first axis. The stop mechanism is engaged to the steering shaft such that the first angular displacement imparts a second angular displacement about a second axis to the stop mechanism. The first angular displacement is greater than the second angular displacement.

A method is provided for improving the driveability of a drive-by wire steering system. The method includes engaging a stop mechanism and a steering shaft such that a first angular displacement of the steering shaft about a first axis imparts a second angular displacement about a second axis to the stop mechanism. The first angular displacement is greater than the second angular displacement. The method also includes limiting the first angular displacement by an interference of the stop mechanism with the steering shaft at a first position and a second position such that a range of motion is provided to the drive-by wire steering system that mimics a mechanically linked steering system range of motion.

The above-described and other features are appreciated and understood by those skilled in the art from the following detailed description, drawings, and appended claims.

DESCRIPTION OF THE DRAWINGS

FIG. 2 is a sectional view of an exemplary embodiment of steer-by wire system;

FIG. 3 is an exemplary embodiment of a stop mechanism of the steer-by wire system of FIG. 2, taken along circle 3—3;

FIG. 4 is a sectional view of the stop mechanism of FIG. 3, taken along lines 4—4;

DESCRIPTION OF THE PREFERRED EMBODIMENT

Figure 1:
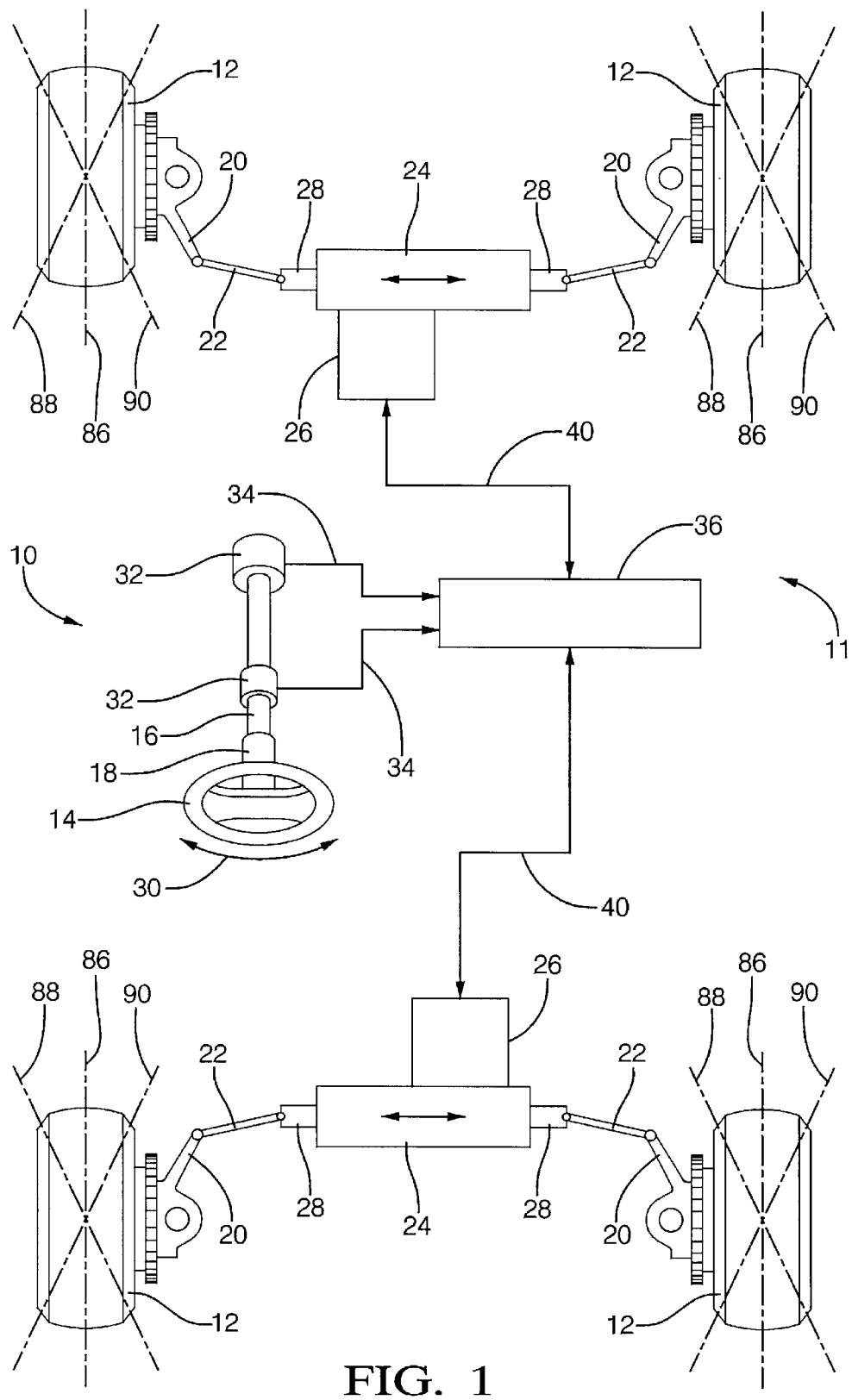
FIG. 1 is a schematic view of a steer-by wire system for a vehicle.
Figure 5:
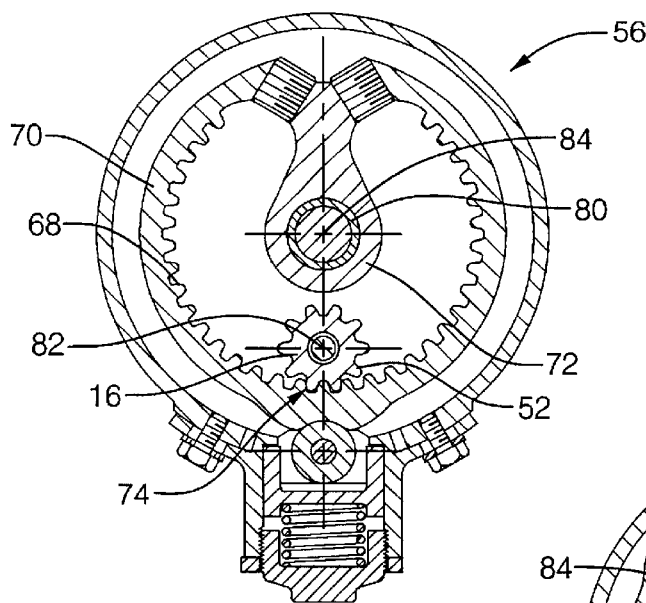
FIG. 5 is a view of the stop mechanism of FIG. 4 in a first position.

Referring now to FIG. 1, a drive-by-wire steering system 10 for use in a vehicle 11 is illustrated. The steering system 10 allows the operator of the vehicle 11 to control the direction of the road wheels 12 of the vehicle through the manipulation of a steering wheel 14. The steering wheel 14 is operatively coupled to a steering column or shaft 16. The steering column 16 is installed in a main housing 18 such that the column is rotatable within the housing.

The road wheels 12 are connected to knuckles 20, which are in turn connected to tie rods 22. The tie rods 22 are connected to a steering assembly 24. The steering assembly 24 includes an electric motor 26 and a steering rod 28. The steering rod 28 is operatively coupled to the electric motor 26 such that the motor is adapted to move the steering rod. The movement of the steering rod 28 controls the direction of the road wheels 12 through the knuckles 20 and tie rods 22 in a known manner.

One or more sensors 32 detect angular displacement or travel 30 of the steering column 16, as well as detecting the torque of the angular displacement. The sensors 32 provide electric signals 34 to a controller 36 indicative of the angular displacement 30 and torque. The controller 26 sends and receives signals 40 to/from the electric motor 26 to actuate the electric motor in response to the angular displacement 30 of the steering wheel 14.

In use, the steering wheel 14 is angularly displaced 30 such that the steering column 16 is also angularly displaced. The sensors 32 detect the angular displacement 30 of the column 16, and the sensors send signals 34 to the controller 36 indicative of the relative amount of angular displacement of the column. The controller 36 sends signals 40 to the motor 26 indicative of the relative amount of the angular displacement 30. In response, the motor 26 moves the steering rod 28 laterally so that the road wheels 12 are turned. Thus, the controller 36 controls the distance that the steering rod 28 is moved based on the amount of the angular displacement 30 of the column 16. Movement of the steering rod 28 manipulates the tie rods 22 and knuckles 20 to reposition the road wheels 12 of vehicle 11. Accordingly, when the steering wheel 14 is turned, the road wheels 12 are turned.

In mechanical steering systems, rotation of the steering wheel 14 is limited by the travel of the road wheels 12. The steering wheel 14 in such mechanical systems is usually configured to rotate about 1.5 times in either direction. However, in the drive-by-wire steering system 10 the steering wheel 14 is mechanically isolated from road wheels 12. Thus, the rotation of the steering wheel 14 is not limited in the drive-by-wire steering system 10.

Now, it has been determined that limiting the rotation of the steering wheel 14 to about 1.5 times in either direction (e.g. about ±540°) is desirable. It has also been determines that limiting the movement of the steering wheel 14 to about ±540° protects the sensors 32 from over rotation.

Referring now to FIG. 2, an exemplary aspect of a drive-by-wire system 10 is shown. Here, the steering column 16 is rotatably mounted in the main housing 18 and a stop housing 42 by way of bearings 44. The stop housing 42 has an upper portion 46 that is connected to a lower portion 48 of the main housing 18. For example, a bolt 50 secures the stop housing 42 and the main housing 18. Of course, other means for connection the stop housing 42 and the main housing 18 are contemplated.

The steering column 16 includes a geared portion 52 defined at its lower end 54, namely at the end opposite the steering wheel 14. The geared portion 54 is in operative contact with a stop mechanism 56. The stop mechanism 56, as well as the geared portion 52 of the steering column 16 are housed within the stop housing 42.

The lower end 54 of the steering column 16 is operatively coupled to a secondary shaft 58 by way of a torque sensor 60 having a torsion bar 62. Additionally, position sensors 64 are operatively positioned proximate the steering column 16 and/or the secondary shaft 58 to detect the angular displacement 30 of the steering column and/or the secondary shaft, respectively. The sensors 60 and 64 provide the signals 34 to controller 36.

For example, the sensor 60 detects characteristics of the movement of and/or the angular rotation 30 of the steering column 16 by detecting the torque and speed of the angular displacement of the steering column. However, the sensor 60 operates within a predetermined range of motion. Namely, the sensor 60 typically has a range of motion of about ±540°.

The secondary shaft 58 is connected to an electric servomotor 66 through a planetary gear reducer 68. The motor 66 is operatively connected to the controller 36. The motor 66, as controlled by the controller 36, is configured to angularly displace 30 the secondary shaft 58, which in turn angularly displaces the steering column 16. Accordingly, the steer-by-wire system 10 is configured to control the direction of road wheels 12 without the manipulation of steering wheel 14 by the operator.

For example in an exemplary embodiment, the road wheels 12 include a sensor (not shown) configured to detect forces on the road wheels. The sensors 60 and/or 64 provide signals to the controller 36 indicative of such forces on the road wheels 12. The controller 36 actuates the motor 66 in response to such road forces to simulate road feeling on the steering wheel 14. Also, the motor 66 is used to return or help return the steering wheel 14 to its center position. For example, after turning the vehicle 11, the operator typically releases the steering wheel 14, expecting the steering wheel to return to its center position as in mechanical steering systems. Once the controller 36 detects via sensors 60 and 64 that the operator has released the steering wheel 14, the controller activates the servomotor 66 to return the steering wheel to its center position as expected.

The stop mechanism 56 is illustrated in FIGS. 3–7. The stop mechanism 56 is configured to limit rotation of the steering wheel 14 and the steering column 16 to about 1.5 rotations (e.g., ±540°). The stop mechanism 56 is configured to provide the steering column 16 with about 1080° of angular displacement 30. Accordingly, the stop mechanism 56 is configured to improve the feel of the steering system 10 by more closely mimicking mechanical steering systems, and is configured to prevent over rotation of the sensors 60 and 64.

Figure 6:
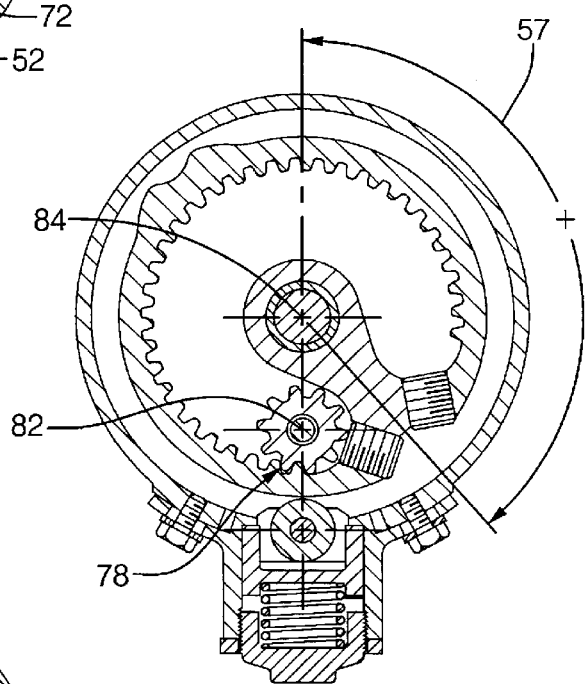
FIG. 6 is a view of the stop mechanism of FIG. 4 in a second position.
Figure 7:
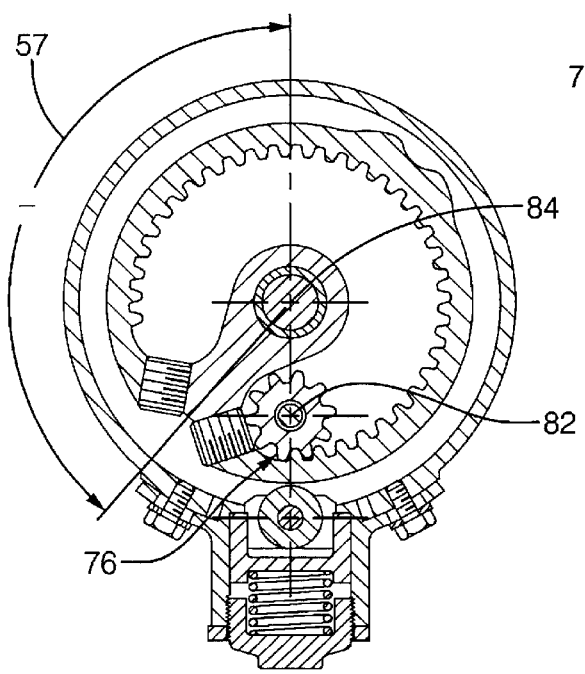
FIG. 7 is a view of the stop mechanism of FIG. 4 in a third position.

The stop mechanism 56 includes a geared portion 68, a cam face 70, and a stop portion 72. The stop mechanism 56 defines a home or center position 74 (FIG. 5), a positive or rightmost position 76 (FIG. 7) and a negative or leftmost position 78 (FIG. 6). The stop portion 72 is defined within the geared portion 68, and is located diametrically opposed from the center position 74. Thus, the stop mechanism 56 defines the positive position 76 and the negative position 78 on either side of the stop portion 72, respectively.

The stop mechanism 56 is rotatably mounted on a stop shaft 80 such that the geared portion 68 is engaged with the geared portion 52 of the column 16. Accordingly, the angular displacement 30 of the steering wheel 14 is translated to the stop mechanism 56 by the geared portions 52 and 68. Thus, the rotation of the column 16 about an axis or centerline 82 causes the geared portion 52 to drive the geared portion 68 such that the stop mechanism 56 rotates about a stop mechanism axis or centerline 84. In sum, the rotation of the column 16 about the centerline 82 causes the geared portion 52 to impart rotation to drive the geared portion 68 such that the stop mechanism 56 rotates about its centerline 84. The rotation of the stop mechanism 56 is limited when the stop mechanism has rotated to the point where the column 16 abuts or interferes with the stop portion 72 at either positive position 76 (FIG. 7) or negative position 78 (FIG. 6).

Moreover, the geared portions 52 and 68 are configured such that rotation of the column 16 about ±540° rotates the stop mechanism 56 an angle 57 prior to the steering column abutting or interfering with stop portion 72. In an exemplary embodiment, angle 57 is about ±140°. Thus, the angular displacement 30 of the steering wheel 14 of +540° rotates stop mechanism 56 +140° from the center position 74 to the positive position 76. Conversely, the angular displacement 30 of the steering wheel 14 of −540° rotates the stop mechanism 56 −140° from the center position 74 to the negative position 78. In sum, the steering column 16 has a total range of motion of about 1080° and the stop mechanism 56 has a total range of motion of about 280°.

When the stop mechanism 56 is in the center position 74, the steering wheel 14 is in its center or normal position. In this position, the road wheels 12 are pointed parallel to the vehicle 11 (e.g., line 86 in FIG. 1). However, the angular displacement 30 of the steering wheel 14 to its rightmost or positive position causes the stop mechanism 56 to rotate to the positive position 76. Here, the motor 26 moves the road wheels 12 via the steering assembly 24 such that the road wheels are pointed to the right (e.g., line 88 in FIG. 1). Similarly, the angular displacement 30 of the steering wheel 14 to its negative or leftmost position causes the stop mechanism 56 to rotate to the negative position 78. Again, at this point the motor 26 moves the road wheels 12 via the steering assembly 24 such that the road wheels are pointed to the left (e.g., line 90 in FIG. 1).

Of course, it should be recognized that the stop mechanism 56 is described above by way of example as being configured for angular displacement 30 of column 16 of about ±540° translating into rotation of the stop portion 72 of about ±140°. The stop mechanism 56 being configured to provide alternate amounts of angular displacement for the steering wheel 14 and/or stop mechanism 56 are contemplated.

The steering system 10 having the stop mechanism 56 provides the drive-by wire steering system with the "feel" of a mechanical steering system. Namely, the stop mechanism 56 provides a mechanical stop in the steering system 10 to provide the "feel" of a mechanical steering system. Thus, steering system 10 improves the "driveablity" or "feel" of vehicles 11 having such drive-by-wire steering systems. Additionally, the steering system 10 having the stop mechanism 56 protects the sensors 60 and 64 from over rotation beyond a predetermined limit.

As illustrated, the drive-by-wire steering system 10 controls the direction of both the front and rear sets of road wheels 12 of vehicle 11. However, control of only the front or rear set of road wheels 12 is contemplated. Additionally, the steering system 10 is illustrated controlling the front and rear set of road wheels in a similar direction. Of course, the steering system 10 controlling the front and rear set of road wheels 12 in a different direction, and/or controlling the front and rear set of road wheels in a similar different at some speeds, and a different direction at other speeds are contemplated.

Referring again to FIG. 4, an alternate aspect of the stop mechanism 56 is illustrated. Here, the stop portion 72 further includes adjustment screws 92 and 94 shown in phantom. The adjustment screws 92 and 94 are configured to provide the stop mechanism 56 with the ability to adjust or calibrate the positive position 76 and the negative position 78, respectively. The adjustment screws 92 and 94 are tightenable to the point where the screw(s) protrudes from the stop portion 72 (e.g., past geared portion 68). Conversely, the adjustment screws 92 and 94 are retractable to the point where the screw(s) do not protrude through the stop portion 72.

Thus, with adjustment screws 92 and 94 protruding past geared portion 68 the rotation of the stop mechanism 56 is limited when the stop mechanism has rotated to the point where column 16 abuts adjustment screw 92 at the positive position 76 or the adjustment screw 94 at negative position 78. Alternately, with the adjustment screws 92 and 94 retracted to the point where the screw(s) do not protrude past the geared portion 68, the rotation of the stop mechanism 56 is limited when the stop mechanism has rotated to the point where the column 16 abuts the stop portion 72 at the positive position 76 or the negative position 78. In this manner, the adjustment screws 92 and 94 are configured to make fine tune or calibration type adjustments to angle 57. Thus, in the example where the steering column 16 has a total range of motion of about 1080° and the stop mechanism 56 has a total range of motion of about 280°, the adjustment screws 92 and 94 are configured to make fine tune or calibration type adjustments to the range of motion of the stop mechanism 56 by about ±5°.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A drive-by wire steering system, comprising:
    a steering shaft being configured for a first angular displacement about a first axis, said steering shaft comprising a first geared portion and a first end, said first end being connectable to a vehicle's steering wheel; and
    a stop mechanism comprising a stop portion and a second geared portion, said stop portion defining a first position and a second position, said first geared portion and said second geared portion being operatively engaged such that said first angular displacement of said steering shaft imparts a second angular displacement about a second axis to said stop mechanism, said first angular displacement being limited when said second angular displacement is such that said steering shaft abuts said stop portion at either said first position or said second position.

2. The drive-by wire steering system of claim 1, wherein said first angular displacement is larger than said second angular displacement.

3. The drive-by wire steering system of claim 2, wherein said first angular displacement is about 1080° and said second angular displacement is about 280°.

4. The drive-by wire steering system of claim 1, wherein said stop portion further comprises means for adjusting said first position and/or said second position by adjusting said angular displacement of said stop mechanism about said second axis.

5. The drive-by wire steering system of claim 4, wherein said means for adjusting said first position and/or said second position comprises:
    screws disposed in said stop portion, said screws being configured to adjust said angular displacement of said stop mechanism about said second axis by about ±5.

6. A method of preventing over rotation of a sensor in a drive-by wire steering system where the sensor has a predetermined displacement range, comprising:
    connecting the sensor to a steering shaft, said steering shaft being configured for a first angular displacement about a first axis;

engaging a stop mechanism to said steering shaft such that said first angular displacement imparts a second angular displacement about a second axis to said stop mechanism, said first angular displacement being greater than said second angular displacement; and abutting said stop mechanism and said steering shaft at a first position and a second position to limit said first angular displacement of said steering shaft such that the sensor is maintained within the predetermined displacement range.

7. The method of claim 6, further comprising limiting said first angular displacement of said steering shaft to about ±540°.

8. The method of claim 7, further comprising limiting said second angular displacement of said stop mechanism to about ±140°.

9. The method of claim 5, further comprising calibrating said first position and said second position of said stop portion via adjustment screws by about ±5°.

10. A method of improving the driveability of a drive-by wire steering system, comprising engaging a stop mechanism and a steering shaft such that a first angular displacement of said steering shaft about a first axis imparts a second angular displacement about a second axis to said stop mechanism, said first angular displacement being greater than said second angular displacement; and limiting said first angular displacement by an interference of said stop mechanism with said steering shaft at a first position and a second position such that a range of motion is provided to the drive-by wire steering system that mimics a mechanically linked steering system range of motion.

11. The method of claim 10, further comprising limiting said first angular displacement of said steering shaft to about ±540°.

12. The method of claim 11, further comprising limiting said second angular displacement of said stop mechanism to about ±140°.

13. The method of claim 10, further comprising calibrating said first position and said second position of said stop portion via adjustment screws by about ±5°.

* * * * *